(12) United States Patent
Becker et al.

(10) Patent No.: US 10,346,152 B2
(45) Date of Patent: Jul. 9, 2019

(54) FACILITATING USE OF A UNIVERSAL INTEGRATED CIRCUIT CARD (UICC) FOR SECURE DEVICE UPDATES

(71) Applicants: AT&T Mobility II LLC, Atlanta, GA (US); AT&T Intellectual Property I, L.P., Atlanta, GA (US)

(72) Inventors: Thomas Becker, Atlanta, GA (US); Paul W. Nichols, Sr., Cumming, GA (US); Michael Calamusa, Cumming, GA (US); Mike Horton, Round Rock, TX (US); Robert Osterwise, Cumming, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 129 days.

(21) Appl. No.: 15/271,135

(22) Filed: Sep. 20, 2016

(65) Prior Publication Data
US 2018/0081669 A1 Mar. 22, 2018

(51) Int. Cl.
*H04L 9/32* (2006.01)
*G06F 8/65* (2018.01)
(Continued)

(52) U.S. Cl.
CPC ............. *G06F 8/65* (2013.01); *H04L 9/083* (2013.01); *H04L 9/0838* (2013.01); *H04L 9/321* (2013.01);
(Continued)

(58) Field of Classification Search
CPC ....... G06F 8/65; H04L 9/0838; H04L 9/3247; H04L 63/123
(Continued)

(56) References Cited

U.S. PATENT DOCUMENTS 7,103,460 B1 9/2006 Breed
7,356,389 B2 4/2008 Hoist et al.
(Continued)

FOREIGN PATENT DOCUMENTS

CA 2739989 A1 4/2010
DE 102012003000 A1 8/2012
(Continued)

OTHER PUBLICATIONS

Romano Fantacci ; A Network Architecture Solution for Efficient IOT WSN Backhauling Challenges and Opportunities; IEEE Wireless Communications ( vol. 21, Issue: 4, Aug. 2014 ); p. 113-119.*
(Continued)

*Primary Examiner* — Monjur Rahim
(74) *Attorney, Agent, or Firm* — Amin, Turocy & Watson, LLP

(57) ABSTRACT

Apparatus, methods and systems facilitating communications via a mobile internet-enabled connection interface are provided. One apparatus is configured to perform various operations, including performing a first type of security function associated with determining whether an information package is authorized to be received and downloaded to a device other than the apparatus, wherein the information package is associated with updating a functionality of the device; and performing a second type of security function associated with identifying an authorized user of the apparatus.

19 Claims, 10 Drawing Sheets

(51) Int. Cl.
*H04L 9/08* (2006.01)
*H04L 29/06* (2006.01)

(52) U.S. Cl.
CPC .......... *H04L 9/3247* (2013.01); *H04L 63/083* (2013.01); *H04L 63/0823* (2013.01); *H04L 63/0884* (2013.01); *H04L 63/105* (2013.01); *H04L 63/123* (2013.01); *H04L 2209/76* (2013.01)

(58) Field of Classification Search
USPC ....................................................... 713/159
See application file for complete search history.

(56) References Cited

U.S. PATENT DOCUMENTS

| | | | |
|---|---|---|---|
| 8,190,322 | B2 | 5/2012 | Lin et al. |
| 8,624,758 | B2* | 1/2014 | Ingram .................... G08G 1/20 340/995.1 |
| 9,043,016 | B2 | 5/2015 | Filippov et al. |
| 9,083,581 | B1 | 7/2015 | Addepalli et al. |
| 9,304,515 | B2 | 4/2016 | Cudak et al. |
| 9,443,358 | B2 | 9/2016 | Breed |
| 2004/0098179 | A1 | 5/2004 | Sokoloski et al. |
| 2005/0251304 | A1 | 11/2005 | Cancellara et al. |
| 2011/0004871 | A1* | 1/2011 | Liu ........................... G06F 8/65 717/173 |
| 2012/0182939 | A1* | 7/2012 | Rajan .................... A61B 5/0008 370/328 |
| 2014/0025253 | A1 | 1/2014 | Rybak et al. |
| 2014/0059534 | A1* | 2/2014 | Daum ....................... G06F 8/65 717/172 |
| 2014/0088827 | A1 | 3/2014 | Yashiro et al. |
| 2014/0109075 | A1* | 4/2014 | Hoffman ................... G06F 8/65 717/169 |
| 2014/0207629 | A1 | 7/2014 | Bradley et al. |
| 2014/0282470 | A1* | 9/2014 | Buga ......................... G06F 8/65 717/170 |
| 2014/0380442 | A1* | 12/2014 | Addepalli ............ H04W 4/046 726/6 |
| 2015/0100179 | A1 | 4/2015 | Alaniz et al. |
| 2015/0301821 | A1* | 10/2015 | Danne ..................... G06F 8/654 717/169 |
| 2015/0350914 | A1 | 12/2015 | Baxley et al. |
| 2016/0021529 | A1 | 1/2016 | Park et al. |
| 2016/0086391 | A1 | 3/2016 | Ricci |
| 2016/0196132 | A1* | 7/2016 | Searle ................... H04L 41/082 717/173 |
| 2016/0197769 | A1* | 7/2016 | Britt .................... H04L 41/0681 709/223 |

FOREIGN PATENT DOCUMENTS

| | | |
|---|---|---|
| DE | 102011117116 B4 | 2/2014 |
| FR | 2998237 A1 | 5/2014 |

OTHER PUBLICATIONS

Gordon, et al., "Team 6: Traffic Net," Paving the Road to a New Future for Connected Cars, 2014, 22 pages. http://www.personal.psu.edu/users/r/m/rma5287/Connected%20Car%20Project%20Report.pdf. Retrieved on Sep. 16, 2016.

Huhns, "Interaction-Oriented Software Development," International Journal of Software Engineering and Knowledge Engineering, 2001, World Scientic Publishing Company, 21 pages. http://cse.sc.edu/~huhns/journalpapers/HuhnsIJSEKE.pdf. Retrieved on Sep. 16, 2016.

Bingxin, et al., "Intelligent Vehicle Navigation System Connected With Internet," International Telemetering Conference Proceedings, 2003, International Foundation for Telemetering, 7 pages. https://arizona.openrepository.com/arizona/bitstream/10150/582033/3/ITC_2003.pdf. Retrieved on Sep. 16, 2016.

Chen, et al., "Ohio State University at the 2004 DARPA Grand Challenge: Developing a Completely Autonomous Vehicle," IEEE Intelligent Systems, 2004, 4 pages. http://www.ece.osu.edu/ion/documents/x5its1.pdf. Retrieved on Sep. 16, 2016.

Haddrell, "Towards an Autonomous Vehicle Enabled Society: Cyber Attacks and Countermeasures," Royal Holloway Univ. of London, 2016, 62 pages. https://www.royalholloway.ac.uk/isg/documents/pdf/technicalreports/2016/rhulisg20164michaelhaddrell.pdf. Retrieved on Sep. 16, 2016.

Pushpa, "Embedded Just Drive for Automotive Applications Using Can and Android in Support With FPGA Intelligence," International Journal of Advanced Information and Communication Technology, May 2014, vol. 1, Issue No. 1, pp. 63-67. http://citeseerx.ist.psu.edu/viewdoc/download?doi=10.1.1.678.5991&rep=rep1&type=pdf. Retrieved on Sep. 16, 2016.

* cited by examiner

FACILITATING USE OF A UNIVERSAL INTEGRATED CIRCUIT CARD (UICC) FOR SECURE DEVICE UPDATES

TECHNICAL FIELD

The subject disclosure relates generally to communications systems, and, for example, to systems, methods and/or machine-readable storage media for facilitating use of a universal integrated circuit card (UICC) for secure device updates.

BACKGROUND

One of the key issues for various devices that operate based on stored software/firmware is the ability to update software/firmware for one or more of the components in the vehicle. For example, as issues are discovered during production of devices, these components may need to be updated in a timely and secure manner. However, updating components can be expensive and time-consuming. Thus, systems, methods and/or machine-readable storage media facilitating use of a UICC for secure, cost-effective and timely device updates is desired.

DETAILED DESCRIPTION

Figure 1:
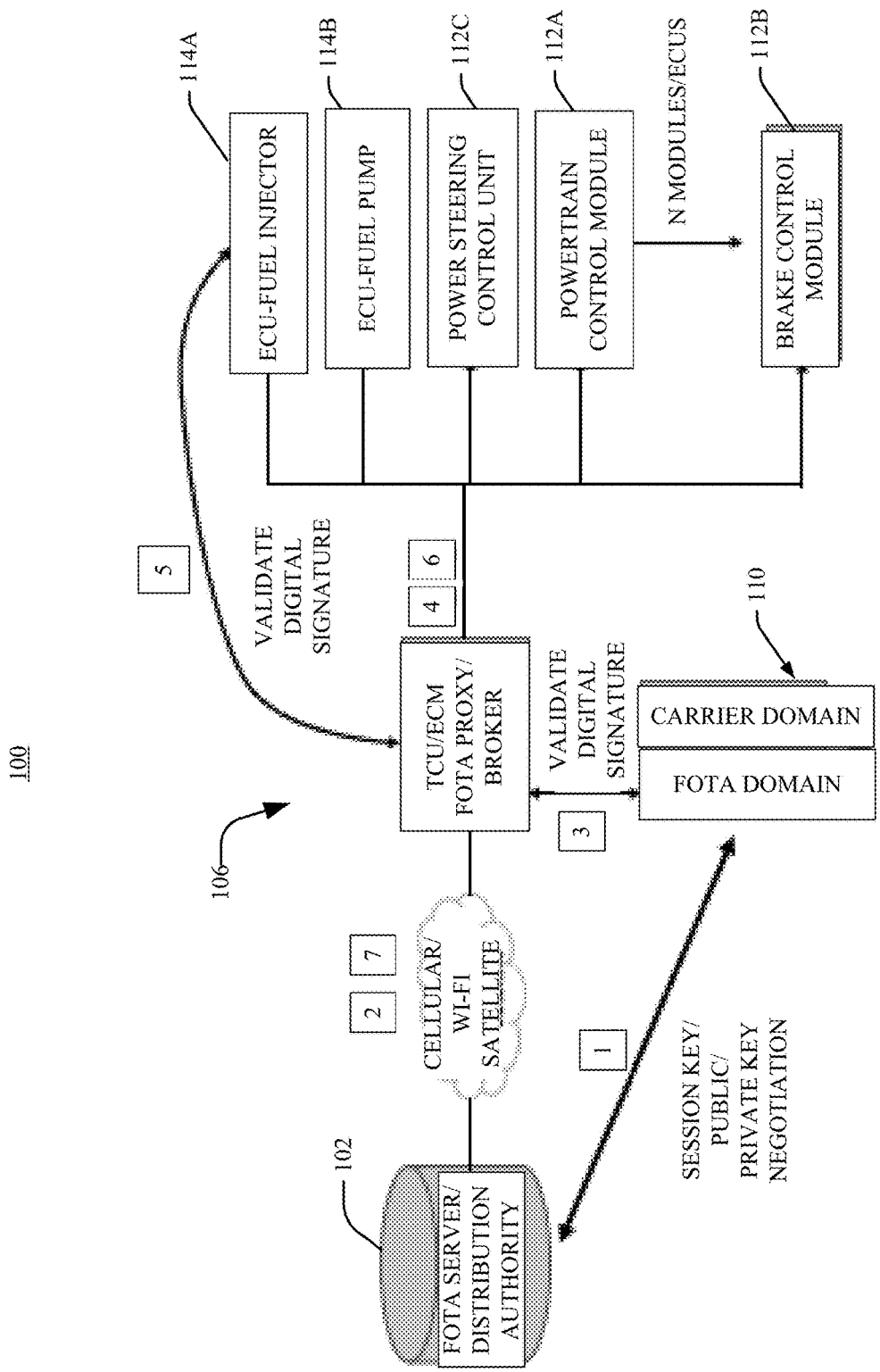
FIG. 1 illustrates an example, non-limiting block diagram of a system that facilitates use of a UICC for secure device updates in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies. Further, the terms "femto" and "femto cell" are used interchangeably, and the terms "macro" and "macro cell" are used interchangeably.

One of the key issues for various devices that operate based on stored software/firmware is the ability to update software/firmware for one or more of the components in the vehicle. For example, as issues are discovered during production of devices, these components may need to be updated in a timely and secure manner. However, updating components can be expensive and time-consuming. Thus, systems, methods and/or machine-readable storage media facilitating use of a UICC for secure, cost-effective and timely device updates is desired. In some embodiments, the UICC can function as a Trusted Execution Environment (TEE) within the system or device.

One or more embodiments described herein can employ a UICC to provide security functionality for a device. While the UICC can be associated with a first apparatus, the device for which security is provided by the UICC can be a second apparatus (e.g., a component of a connected car, a sensor of a digital home environment, an industrial device, an agricultural device (e.g., tractor), a wearable device, a mobile device (e.g, laptop), any device that uses a security token for outside communications (e.g., tractor, wearable, laptop)). In various embodiments, the device can be any device that can be communicatively coupled to a network and receive one or more software updates to update the functionality of the second apparatus.

In various embodiments, the UICC functionality is expanded beyond providing the ability to connect to a network to facilitating and providing a secure channel for one or more different functions such as software and firmware updates to other devices. One or more embodiments can perform such tasks without need for knowledge of specific, proprietary communication to interact with the device being updated and/or without any advance preparation designed into the device at the time of manufacture. Further, any number of approved/authorized entities can make updates and therefore updates need not be limited only to the manufacturer of the device. One or more embodiments are cost-effective, timely, straightforward and provide for secure updates.

In some embodiments, the UICC is partitioned into two domains: a domain associated with a telecommunications carrier entity and a second domain associated with a manufacturer or other entity such as the original equipment manufacturer of the second apparatus, an entity that has developed or sells software or firmware to update the second apparatus or the like. The domain associated with the telecommunications carrier entity can be dynamically configured by the telecommunications carrier entity and can be related to identifying the authorized user of the device, noting the Quality of Service or other data access privileges and the like. The UICC can be uniquely partitioned so that the UICC also includes a domain that can be controlled and/or dynamically configured by the second entity.

Generally, the first entity can be an entity associated with providing telecommunications functionality for the apparatus and the second entity can be an entity associated with providing operational functionality for the second apparatus. The apparatus can therefore provide two different types of security features: a first type of security feature for the second apparatus (e.g., such as authorization of the information package that will provide the software and/or firmware update to the second apparatus) and a second type of security feature for the apparatus (e.g., such as storage of an authorized user of the first apparatus, processing to confirm an authorized user of the first apparatus and/or one or more privileges or Quality of Service levels for the first apparatus). In some embodiments, the UICC can perform a negotiation process to obtain and/or manage one or more keys to provide for authentication and/or crypto processing.

Accordingly, in some embodiments, the UICC capability can be paired with providing security for one or more other devices or components of one or more other devices to provide secure and inexpensive software updates to components/devices. For a device/vehicle manufacturer, for example, this solution can provide a cost-effective and secure ability to update components in their devices/vehicles. In embodiments in which the UICC already exists in a device, the device manufacturer can avoid the cost of adding a Hardware Security Module and can merely include an updated/modified UICC that can provide one or more functions described herein so the UICC can be provisioned with one or more of the security capabilities described herein. Allowing such updates to be performed via provisioning of the UICC can reduce cost to build devices or systems that use the devices (e.g., can reduce the cost to build or modify connected cars for example; can reduce the cost to build or modify a telematics control unit, a fuel injection device, a home security sensor or the like).

In one embodiment, an apparatus comprises a processor; and a memory that stores executable instructions that, when executed by the processor, facilitate performance of operations. The operations can comprise performing a first type of security function associated with determining whether an information package is authorized to be downloaded to a device other than the apparatus, wherein the information package is associated with updating a functionality of the device. The operations can also comprise performing a second type of security function associated with identifying an authorized user of the apparatus.

In another embodiment, a method is provided. The method comprises receiving, by a first device comprising a processor, an information package for updating a functionality of a component of first device, wherein the information package is received from a distribution authority device comprising a key negotiated with a second device associated with providing security for the first device; and validating, by the first device, the information package with the second device based on whether a first value of the information package corresponds to a second value stored at the second device, wherein the second value is stored at the apparatus in response to a negotiation of the key with the distribution authority device prior to the receiving by the first device.

In another embodiment, a machine-readable storage medium comprising executable instructions is provided. The executable instructions are that which, when executed by a processor, facilitate performance of operations. The operations can comprise performing a first type of security function associated with determining whether an information package is authorized to be employed to facilitate a software update to a device communicatively coupled to an apparatus comprising the processor and machine-readable storage medium. The operations can also comprise performing a second type of security function associated with confirming a privilege associated with use of the apparatus.

Figure 2:
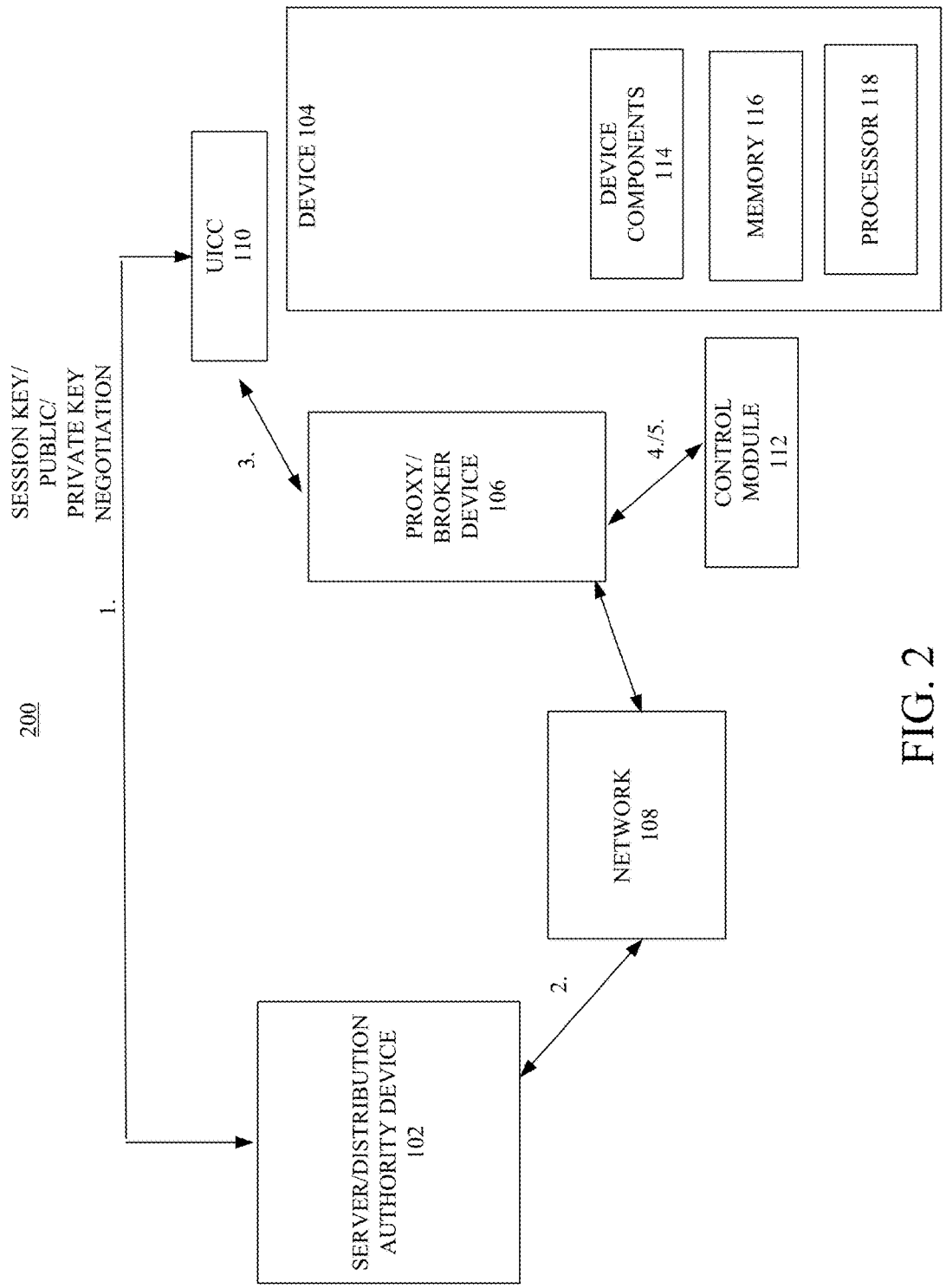
FIG. 2 illustrates another example, non-limiting block diagram of a system that facilitates use of a UICC for secure device updates in accordance with one or more embodiments described herein.
Figure 3:
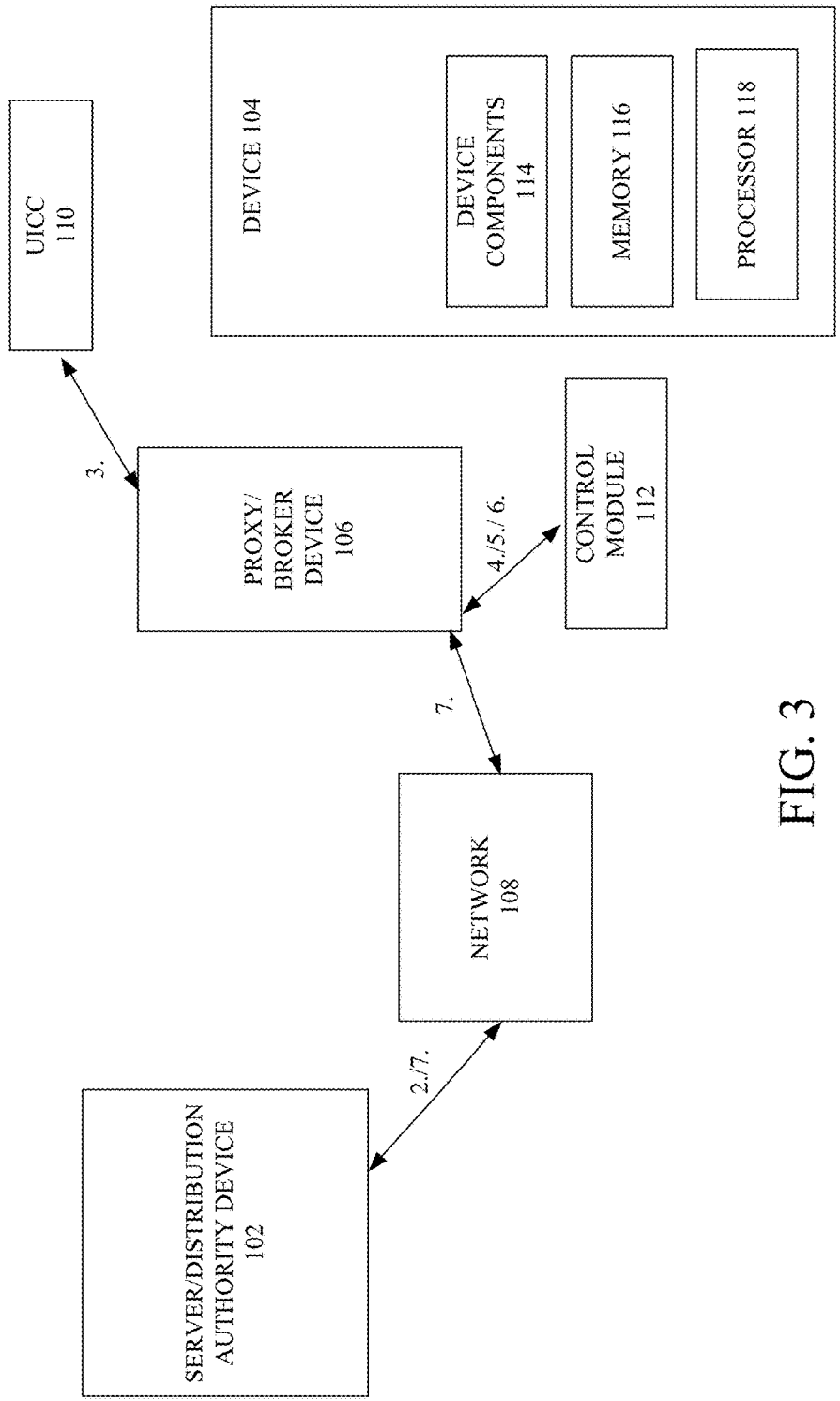
FIG. 3 illustrates another example, non-limiting block diagram of a system that facilitates use of a UICC for secure device updates in accordance with one or more embodiments described herein.

Various embodiments of systems will now be described with reference to FIGS. 1, 2 and/or 3. FIG. 1 illustrates an example, non-limiting block diagram of a system that facilitates use of a UICC for secure device updates in accordance with one or more embodiments described herein. FIG. 2 illustrates another example, non-limiting block diagram of a system that facilitates use of a UICC for secure device updates in accordance with one or more embodiments described herein. FIG. 3 illustrates another example, non-limiting block diagram of a system that facilitates use of a UICC for secure device updates in accordance with one or more embodiments described herein. Repetitive description of like elements employed in other embodiments described herein is omitted for sake of brevity.

As shown in FIGS. 1 and 2, in some embodiments, at step 1, one or more encryption keys can be negotiated between the server/distribution authority device 102 (e.g., Firmware Over The Air (FOTA) server/distribution authority device 102 of FIG. 1 and server/distribution authority device of FIG. 2) and the secure FOTA partition (e.g., the FOTA Domain of FIG. 1) on the Universal Integrated Circuit Card (UICC) 110. In some embodiments, one or more encryption keys and/or digital signatures can be pre-loaded or stored at the FOTA partition of the UICC at the time of system manufacture.

In various embodiments, the keys referenced herein can be or include cryptographic keys instead of encryption/decryption keys. The validation key of a public/private key pair would be on the UICC 110 already in some embodiments (as opposed to being transmitted during the communication of the information package). The UICC 110 key can be pre-provisioned and/or can be updated directly over the air (e.g., via a wireless network) at another time. The proxy/broker device 106 can securely call to the UICC 110 to validate the information package digital signature the proxy/device 106 received from the server/distribution authority device 102.

The FOTA software and/or hardware can be a management technology in which operating firmware (or, in some cases, software generally) for a particular device can be upgraded, modified and/or updated over a wired or wireless network. In some embodiments, the updates are initiated by the equipment manufacturer of the device or another developer of software or firmware.

While the embodiments described herein employ the term "UICC," the terms "UICC" and "Subscriber Identity Module (SIM)" can be interchangeable. As such, SIM cards (or any card or device that can be employed for storing a unique identification number for the owner of the mobile device and/or storing data or storing information about privileges and/or use of the mobile device) can be employed in lieu of or in addition to the UICC in one or more embodiments described herein. In various embodiments, the UICC 110 can be or include any SIM that connects to a network.

The FOTA partition of the UICC 110 can be included in or associated with the FOTA component 406 of the UICC 110 in some embodiments. In some embodiments, step 1 can be performed over wired or a wireless network. By way of example, but not limitation, the network can be a cellular, Wi-Fi or satellite network. In some embodiments, the network can be one or more terrestrial land lines. In various embodiments, any number of different wireless or wired networks can be employed that can provide a bi-directional flow of information to facilitate exchange and/or negotiation of one or more encryption keys between the UICC 110 and the server/distribution authority device 102.

In some embodiments, the control module 112 can encompass one or more control units or control modules associated with or that can control the device 104 (e.g., Engine Control Unit (ECU), sensor, light, alarm system or any other device or component of a device that can have a software/firmware update to functionality). Examples of the control module 112 are shown in FIG. 1 as a Powertrain Control Module 112A, a Brake Control Module 112B and/or a Power Steering Control Unit 112C although any number of different control modules for controlling any number of different types of devices (e.g., automotive, industrial, agricultural, home security, home comfort services (e.g., thermostat) or the like) can be employed. The control module 112 can control one or more operations of a device and/or cause the device to update software or firmware of the device. One or more embodiments described herein may be able to be utilized for manufacturers of vehicles and/or manufacturers of vehicle components. For example, manufacturers can include, but are not limited to, Bosch, TRW, Visteon, Tesla, General Motors, Ford and/or Toyota.

As described above, the device components 114 can encompass the actual components or systems controlled by the control module 112 and for which control is updated based on the updated FOTA package. The device 104 can be, but is not limited to being, any Bluetooth device, any home environment device, a tractor, connected car or the like in accordance with one or more different use cases provided yesterday. In some embodiments, the device 104 can be included in or associated with smart home or digital home environments or systems, home security or the like. These applications can typically use a home hub with a cellular connection and UICC 110. This home hub can connect to one or more different types of device components 114 (e.g., sensors) such as motion or door sensors. In some embodiments, telematics control unit (TCU) would be the home hub and the ECUs would be the door or motion sensors. The concept to update the door or motion sensors securely would be the same.

In some embodiments, the step 1 could be forgone and/or avoided altogether. As shown in FIG. 3, in some embodiments, step 3 need not be included as one or more keys can be prestored in the UICC 110 and/or the server/distribution authority device 102. For example, one or more keys can be accessed from a repository by the UICC 110. In various embodiments, alternatives for encryption keys can include the keys being negotiated dynamically as described in above or the keys being pre-stored onto the UICC 110 for future use when a secure tunnel back to the server/distribution authority device 102 (e.g., FOTA server/distribution authority device 102) is required and/or desired.

At step 2, the information package (e.g., FOTA package) can be transmitted from server/distribution authority device 102 to the proxy/broker device 106 (e.g., TCU/ECM FOTA proxy/broker device 106 of FIG. 1 or the proxy/broker device 106 of FIGS. 2 and 3) and the information package can be encrypted using one or more of the encryption keys generated and/or negotiated in step 1. In some embodiments, the encryption keys can provide for a secure communication tunnel allowing the information package to be sent without concern if it is intercepted by a third party. In various embodiments, the tunnel can end at the device 104 and/or the proxy/broker 106, depending on the particular hardware architecture. In some embodiments, the tunnel can end at security component 604.

In some embodiments, the device 104 and proxy/broker 106 are the same physical piece of hardware or a single device. In other embodiments, the device 104 and the proxy/broker 106 reside on or in different pieces of hardware or a single device.

At step 3, the digital signature of the information package can be validated against the value in the FOTA partition on the UICC 110. In some embodiments, step 3 may not be performed over a network. For example, the validation can be performed between the proxy/broker 106 and the UICC 110. In some embodiments, the UICC 110 can be embedded directly inside a device (e.g., proxy/broker device 106) so the proxy/broker device 106 will communicate directly with the UICC 110 via the printed circuit board or other internal system bus of the UICC 110.

At step 4, the information package can be transmitted from the proxy/broker 106 to the device 104 (e.g., vehicle ECU or vehicle module). In various embodiments, the package can be sent from the proxy/broker 106 to the control unit 112 for the device 114 first and the control unit 112 can forward to the device 114, the package can be sent from the proxy/broker 106 directly to the device 114 and/or the package can be sent directly to the device 114 and the control unit 112 concurrently by the proxy/broker 106.

In some embodiments, the device 104 and proxy/broker 106 are the same physical piece of hardware or a single device. In some embodiments, a first flow of information can be from the proxy/broker device 106 to the device 104. In this case, the firmware or software is updated on the device 114 that is also functioning as the proxy/broker device 106. A second flow from 106 to 112 can be provided. In this flow, the proxy/broker device 106 can update a different device (a device associated with device 114) and control module 112. The device 114 can be physically separate from the proxy/broker device 106.

In step 5, the digital signature of the information package can be validated against the value in proxy/broker or UICC 110. The validation of the information package can be with either the proxy/broker device 106 or the UICC 110. In the automotive context, this could occur within a Controller Area Network (CAN) (e.g., CAN-ISO 11898 connection) or an Ethernet connection.

In step 5, the arrow for step 5 points directly to the "ECU-Fuel Injector" in FIG. However, this operation need not be so limited. For example, this step can be followed and provided with any device in the column of FIG. 1 (or any other device) for which an update is intended. The device that receives the update will then perform step 5 back to the proxy/broker.

With regard to steps 4 and/or 5, for an automotive embodiment in which the UICC 110 and/or the device 104 are associated with an automobile (e.g., connected car), validation of the information package can be a network or bus technology internal to the automobile. In an embodiment in which an IoT device and/or IoT application is employed, then this connection and validation can also be performed over a short range wireless connection such as, but not limited to, Bluetooth, Wi-Fi, Zigbee, or Zwave. In various embodiments, IoT devices can be any of a wide host of devices including, but not limited to, hubs (e.g., smart phone hubs), cameras (e.g., doorbell cameras), sensors, smart switches, smart air purifiers, smart lights, smart heaters, smart slow cookers, smart humidifiers, security systems, garage door openers, smart thermostats, smart wall ovens, smart ranges, smart refrigerators, smart dishwashers, smart home locks, smart washers and dryers, smart water heaters, smart outlets, smart fish finder, smart fitness device, smart dog collar and/or smart air conditioners.

In some embodiments, step 5 occurs because the TCU is acting as a proxy for the server/distribution authority device 102 but the control unit 112 and/or device 114 may not know the information package is valid. Without step 5, an interceptor could intrude into a bus for the device 114 and provide a fake/malicious identity for the control unit 112 and begin updating the device 114 or components of the device 114.

In step 6, the control unit 112 can report status of the software or firmware update to the proxy/broker device 106. Example updates can be "update applied OK" or "update not applied-error." Any number of messages or types of information can be reported including, but not limited to, the time of update, a confirmation of the name of the software package updated, whether the update was successful or unsuccessful or the like. At step 7, the proxy/broker device 106 can relay status to server/distribution authority device 102.

In some embodiments, a method can skip step 6 (e.g., in a case in which there is also no confirmation sent back from the device 104 in step 7). In some cases there may not be an acknowledgement message informing as to whether the update was applied ok. Steps 6 and 7 are not necessary for the secure distribution of the information package. These steps can be performed from a management capability to validate the change took place but need not be performed in any embodiments described herein.

In some embodiments, the steps for 4, 5 and 6 are as follows: The proxy/broker device 106 has the entire information package designated for a device 114 or a control module 112. The proxy/broker device 106 can then initiate a file transfer to the target device 114 or control module 112. In some embodiments, once the file transfer is complete and received by the intended recipient (e.g., the device 114 or the control module 112, the device 114 or control module 112 (whichever device receives the information package) can then request a validation of the information package from the proxy/broker device 106. This validation can be in the form of a checksum or a digital signature in various embodiments. The values can be compared and if the values match then the device 114 or control module can know the information package is a valid firmware update. If the values do not match then the device 114 or control module 112 can forgo applying the firmware update. Once the device 114 or control module 112 successfully loads and installs this firmware update then the device 114 or control module can send a status report back to the proxy/broker device 106 indicating success. If, for some reason, the firmware update was not successful, then the device 114 or control module 112 can report back to the proxy/broker device 106 that the update was not successful.

In some embodiments, the information package can be validated at each leg of transfer to uphold integrity along the complete transfer path. The device 114 can be sent an updated information package from any point on the operating network in various embodiments. The device 114 can validate that the received information package is an authorized install package (validation can be performed based on a particular digital signature). The device 114 could validate this against a signed package with a public key stored that was pre-provisioned, or by making a secure call to the proxy/broker 106 in some manner to confirm the received information package.

One or more embodiments described herein can be employed in one or more standards involving and/or associated with one or more standards for Internet of Things (IoT) (e.g., the GSMA IoT Security standard), the GSMA security standards (e.g., GSMA Security working group), European Telecommunications Standards Institute (ETSI) and/or any other working group or standard associated with promoting best practices to use the UICC to provide application level security using the UICC. For example, the UICC 110 specified herein one or more of the ETSI standards involving UICCs can be and they might be interested as well. In some embodiments, the server/distribution authority device 102, proxy/broker 108 and/or the UICC 110 can be employed in one or more standards. An example of a method and embodiment of the various components can be as shown in FIG. 1 and/or any of the other figures included herein.

In the embodiments shown in FIGS. 1, 2 and 3, the control module 112 is shown outside of the device 104. However, in some embodiments, the control module 112 can be included within and/or electrically or communicatively coupled to the device 104. One or more of the embodiments described herein can update the control module 112 or one or more other components that are not internal to a device 104 but are in close proximity to the device 104 (e.g., such as within a car or a building).

Figure 4:
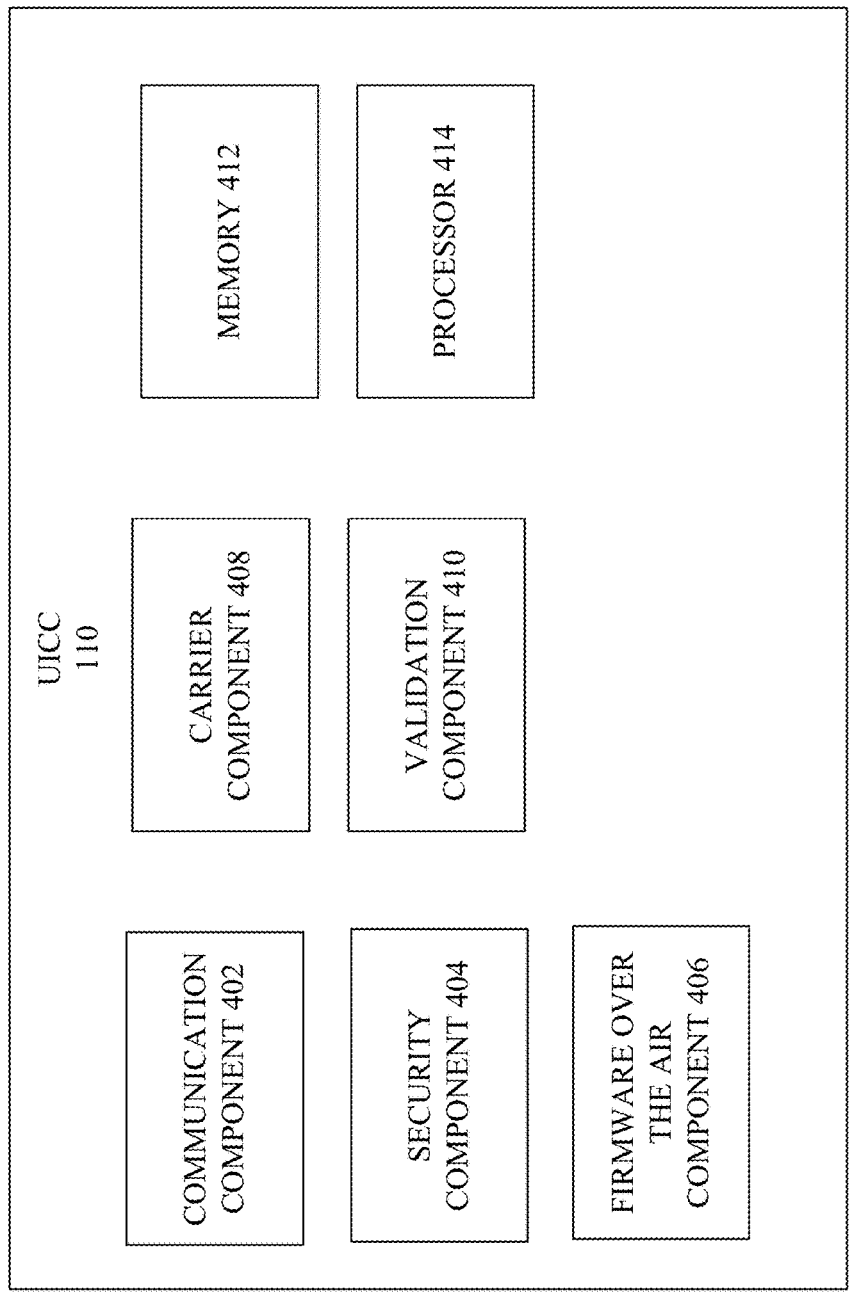
FIG. 4 illustrates an example, non-limiting block diagram of a UICC that can be employed for secure device updates in accordance with one or more embodiments described herein.
Figure 5:
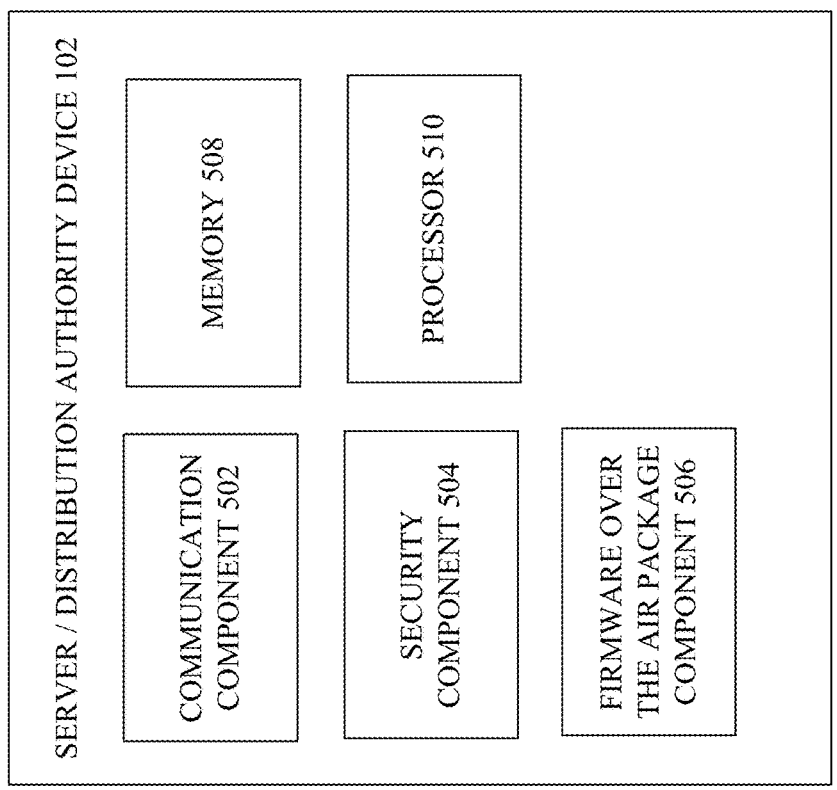
FIG. 5 illustrates an example, non-limiting block diagram of a server/distribution authority that can be employed for secure device updates in accordance with one or more embodiments described herein.
Figure 6:
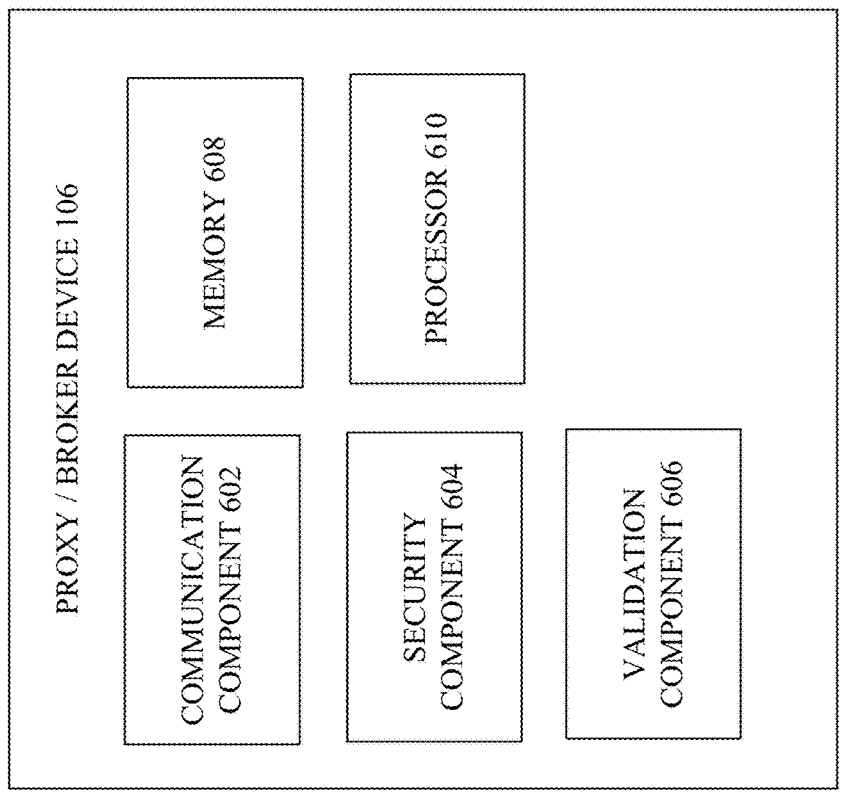
FIG. 6 illustrates an example, non-limiting block diagram of a proxy/broker that can be employed for secure device updates in accordance with one or more embodiments described herein.

FIGS. 4, 5 and 6 are discussed together with reference to various components that can interact with one another and/or in connection with one or more functions described herein. FIG. 4 illustrates an example, non-limiting block diagram of a UICC that can be employed for secure device updates in accordance with one or more embodiments described herein. As shown, the server/distribution authority device 102 can comprise a communication component 402, a security component 404, a FOTA component 406, a carrier component 408, a validation component 410, a memory 412 and/or a processor 414, one or more of which can be electrically and/or communicatively coupled to one another to perform one or more functions described herein. The server/distribution authority device 102 can be or include one or more of the structure and/or functionality of the server/distribution authority 102 of FIGS. 2 and/or 3 in some embodiments. In some embodiments, the server/distribution authority 102 can be or include one or more of the FOTA Server/Distribution Authority 102 of FIG. 1.

FIG. 5 illustrates an example, non-limiting block diagram of a server/distribution authority that can be employed for secure device updates in accordance with one or more embodiments described herein. As shown, the server/distribution authority device 102 can comprise a communication component 502, a security component 504, a FOTA package component 506, a memory 508 and/or a processor 510, one or more of which can be electrically and/or communicatively coupled to one another to perform one or more functions described herein. The server/distribution authority device 102 can be or include one or more of the structure and/or functionality of the server/distribution authority 102 of FIGS. 2 and/or 3 in some embodiments. In some embodiments, the server/distribution authority 102 can be or include one or more of the FOTA Server/Distribution Authority 102 of FIG. 1.

FIG. 6 illustrates an example, non-limiting block diagram of a proxy/broker that can be employed for secure device updates in accordance with one or more embodiments described herein. As shown, the proxy/broker device 106 can comprise a communication component 602, a security component 604, a validation component 606, a memory 608 and/or a processor 610, one or more of which can be electrically and/or communicatively coupled to one another to perform one or more functions described herein. The proxy/broker device 106 can be or include one or more of the structure and/or functionality of the proxy/broker device 106 of FIGS. 2 and/or 3 in some embodiments. In some embodiments, the proxy/broker device 106 can be or include one or more of the TCU/ECM FOTA Proxy/broker device 106. Repetitive description of like elements employed in other embodiments described herein is omitted for sake of brevity.

In some embodiments, encryption key negotiation can be performed between the communication component 402 of the UICC 110 and communication component 502 of the server/distribution authority device 102. In some embodiments, the secure FOTA partition on the UICC (e.g., the FOTA Domain of FIG. 1, which can also be associated with or included in the FOTA component 406 of the UICC 110) can be employed to perform the negotiation between the security component 504 of the server/distribution authority device 102 and the security component 404 of the UICC 110. In some embodiments, the negotiation can be or employ any number of different public/private key negotiation protocols or methods whether previously known or otherwise. The carrier component 408 can correspond to or be included in the Carrier Domain (or vice versa) of the FIG. 1 and can perform one or more functions for identification of the user or privileges or use of the UICC 110. In some embodiments, a session key and/or a set of public/private keys can be generated in association with an information package generated by the server/distribution authority device 102.

The information package can be encrypted by the security component 504 of the server/distribution authority with one or more keys generated from the negotiation with the security component 404 of the UICC 110. The communication component 602 can transmit and/or receive information between the proxy/broker device 106 and the UICC 110, control module 112 and/or the server/distribution authority device 102. For example, the communication component 602 can receive from the server/distribution authority device 102 an information package including software for updating one or more components of a device controlled by control module 112.

The communication component 602 of the proxy/broker device 106 can also transmit and/or receive from the communication component 402 of the UICC 110 for validating a digital signature of the information package. The validation can be performed by the validation component 606 of the proxy/broker device 106 and the validation component 410 of the UICC 110. Any number of different approaches can be employed to perform the validation. By way of example, but not limitation, the validation can be performed by the validation component 410 of the UICC 110, for example, comparing one or more values of information (e.g., digital signature) associated with the information package with one or more values stored in the FOTA partition (e.g., which can be associated with or controlled by or stored in the FOTA component 406 or memory 412) of the UICC 110.

The communication component 502 of the server/distribution authority device 102 can transmit the information package to the proxy/broker 106 and the validation component 606 of the proxy/broker device 106 can validate the information package with the security component 404 of the UICC 110. For validation, a digital signature of the information package can be compared with a value generated and/or stored by the UICC 110 (based on the key generate by the negotiation). To facilitate such validation, there can be a key transmitted from the server/distribution authority device 102 to the proxy/broker associated with the information package.

Upon validation, the communication component 602 of the proxy/broker device 106 can transmit the information package to the control unit 112 and/or the device to be updated. In some embodiments, the digital signature of the information package can be validated once again against value in UICC 110. In some embodiments, the first validation (server/distribution authority device 102 to proxy/broker 106) can be a network connection validation coming from a valid source. The second validation can confirm that the proxy/broker device 106 can be authenticate and this can prevent a man in the middle attack or interception of this transmission.

The proxy/broker device 106 can transmit or otherwise communicate status (e.g., installation successful, installation unsuccessful, information package validated, information package not validated) of the installation of the information package to the server/distribution authority device 102. For example, the communication component 602 can transmit and/or otherwise relay the information. In some embodiments, the security component 604 can determine the status and provide information to the communication component 602 to cause the communication component 602 to output information intended for receipt by the server/distribution authority device 102.

Memory 412, 508, 608, respectively, can be a machine-readable storage medium storing executable instructions and/or a computer-readable storage medium storing computer-executable instructions and/or information for performing the functions described herein with reference to UICC 110, server/distribution authority device 102 and/or proxy/broker device 106 (or components of UICC 110, server/distribution authority device 102 and/or proxy/broker device 106). For example, memory 412 can store instructions that can be executed by processor 414 to determine validity of an information package for updating software/firmware on a device, perform key negotiation with a server/distribution authority 102 or the like. As another example, memory 508 can store instructions that can be executed by processor 510 to perform key negotiation with the UICC 110, generate and/or transmit information packages and/or receive/process status of information package installation at the device. As yet another example, memory 608 can store instructions that can be executed by processor 610 to perform validation with the UICC 110 and/or transmit the information package to the control module 112. Processors 414, 510, 610 can perform one or more of the functions described herein with reference to the respective components shown in FIGS. 4, 5 and 6.

Figure 7:
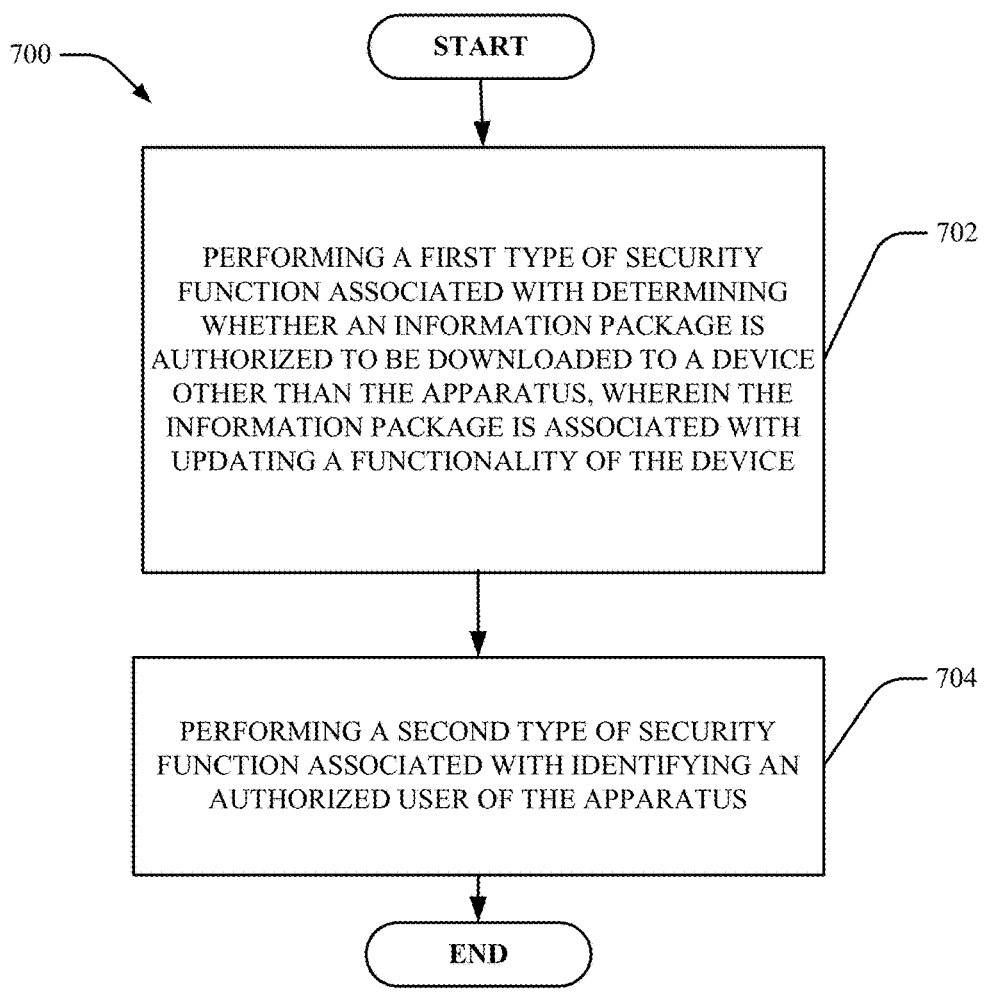
FIGS. 7, 8 and 9 illustrate flowcharts of methods that facilitate use of a UICC for secure device updates in accordance with one or more embodiments described herein
Figure 8:
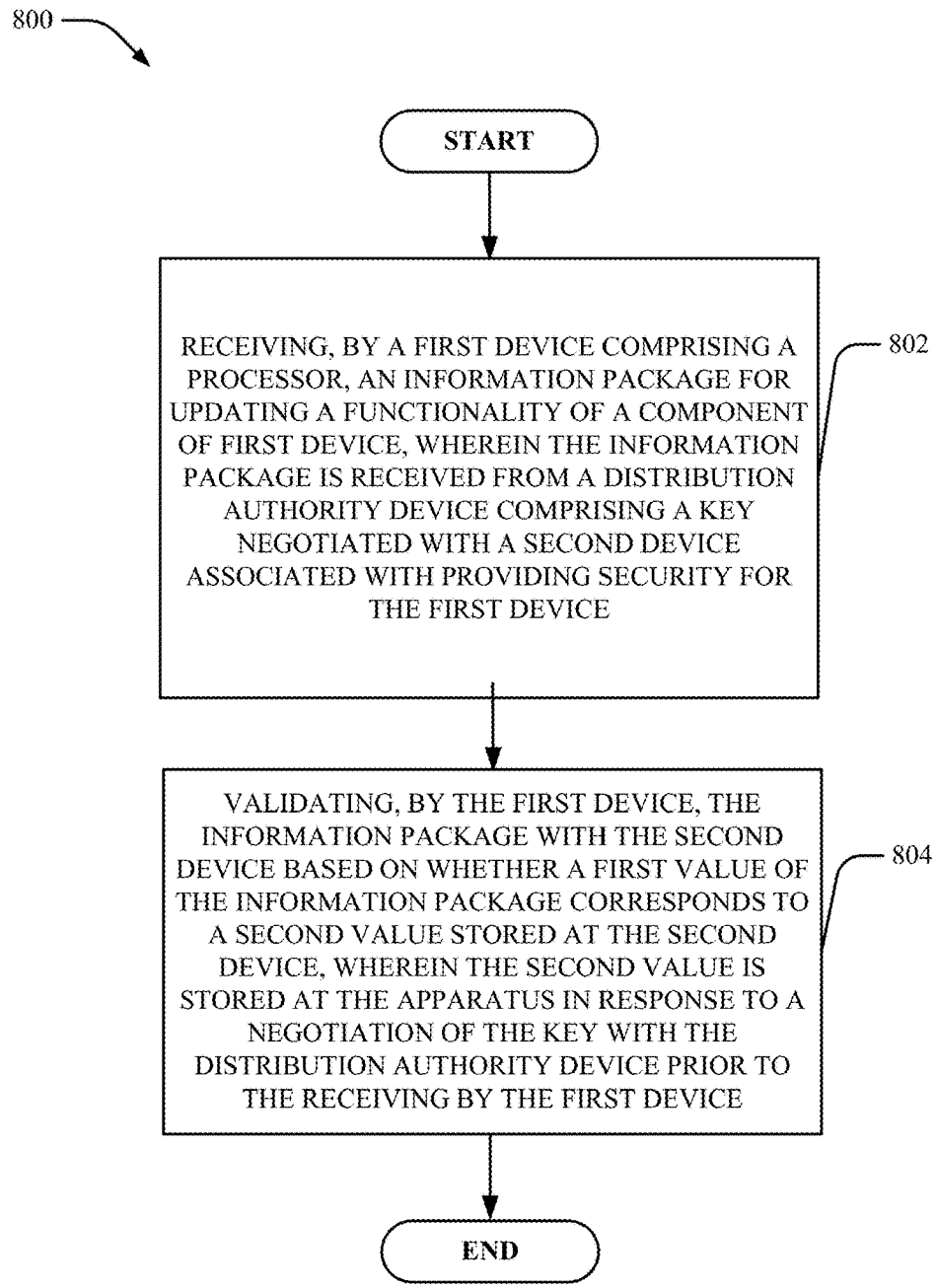
Figure 9:
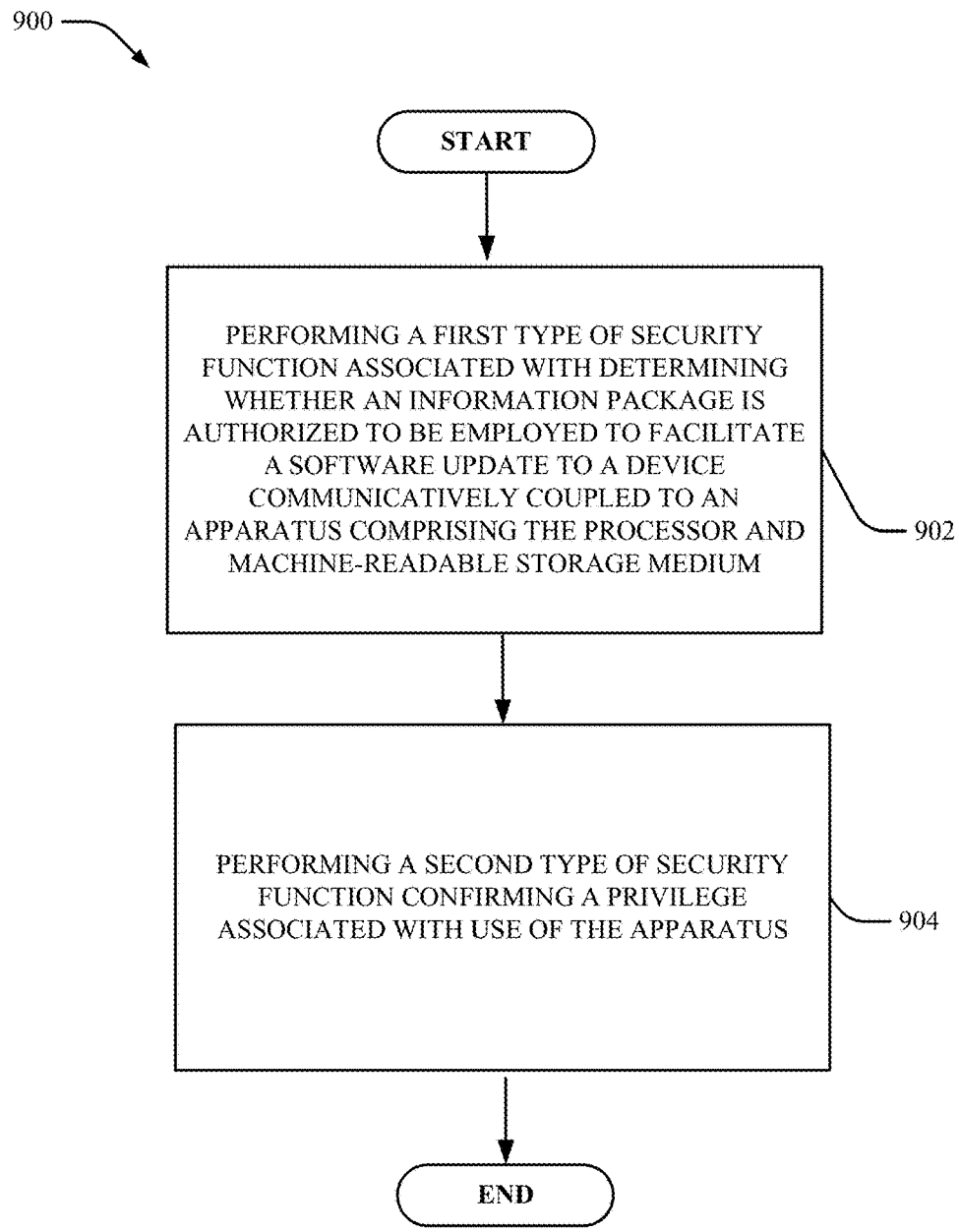

FIGS. 7, 8 and 9 illustrate flowcharts of methods that facilitate use of a UICC for secure device updates in accordance with one or more embodiments described herein. Repetitive description of like elements employed in other embodiments described herein is omitted for sake of brevity.

Turning first to FIG. 7, a method is provided. Method 700 can be performed by a UICC (e.g., UICC 110) or a device having a UICC in various embodiments. At 702, method 700 can comprise performing a first type of security function associated with determining whether an information package is authorized to be downloaded to a device other than the apparatus, wherein the information package is associated with updating a functionality of the device.

In some embodiments, the updating the functionality of the device comprises updating a software functionality of the device other than the apparatus (that performs the method). In various embodiments, the device can comprise, but is not limited to, a component of a connected car, a sensor (e.g., of a digital home environment), any Internet of Things device and/or any device that can have one or more aspects of the software or firmware of the device updated from time to time.

At 704, method 700 can comprise performing a second type of security function associated with identifying an authorized user of the apparatus. In some embodiments, performing the second type of security function can comprise performing the second type of security function associated with the identifying the authorized user of the apparatus via a carrier domain partition of the apparatus.

In some embodiments, although not shown, the method can also comprise performing a key negotiation with a server configured to transmit the information package to the device other than the apparatus and that facilitates the updating of the functionality of the device.

The method can also comprise validating a digital signature of the information package for the device prior to installation of the information package to cause the updating the software functionality on the device. The validating the digital signature can comprise comparing the digital signature to a value stored in a FOTA partition of the apparatus, and wherein the FOTA partition is associated with the performing the first type of security function.

Turning now to FIG. 8, another method is provided. Method 800 can be performed by a control module (e.g., control module 112) in some embodiments. At 802, method 800 can comprise receiving, by a first device comprising a processor, an information package for updating a functionality of a component of first device, wherein the information package is received from a distribution authority device comprising a key negotiated with a second device associated with providing security for the first device.

At 804, method 800 can comprise validating, by the first device, the information package with the second device based on whether a first value of the information package corresponds to a second value stored at the second device, wherein the second value is stored at the apparatus in response to a negotiation of the key with the distribution authority device prior to the receiving by the first device.

In some embodiments, the first device comprises a control module and the second device comprises a universal integrated circuit card.

Although not shown, the method 800 can also comprise updating, by the first device, a software functionality of the component of the first device based on determining that the information package was successfully validated.

Turning now to FIG. 9, another method is provided. The method 900 can be provided by a UICC or a device having a UICC in various embodiments. At 902, method 900 can comprise performing a first type of security function associated with determining whether an information package is authorized to be employed to facilitate a software update to a device communicatively coupled to an apparatus comprising the processor and machine-readable storage medium. In some embodiments, the information package comprises a FOTA package.

In some embodiments, the first type of security function is associated with a first executable instruction of the executable instructions, wherein the first executable instruction is comprised in a first partition of the executable instructions and is associated with a first entity. The first entity can be an original equipment manufacturer of the device.

At 904, method 900 can comprise performing a second type of security function associated confirming a privilege associated with use of the apparatus. In some embodiments, the second type of security function is associated with a second executable instruction in a second partition of the executable instructions and is associated with a second entity. The second entity can be a telecommunications entity of the apparatus.

While not shown, in some embodiments, method 900 can also comprise performing a key negotiation with a server configured to transmit the information package to the device communicatively coupled to the apparatus and that facilitates the software update to the device; validating a digital signature of the information package for the device prior to installation of the information package on the device.

In some embodiments, the device comprises a component of a connected car. In some embodiments, the device comprises an Internet of Things device.

Figure 10:
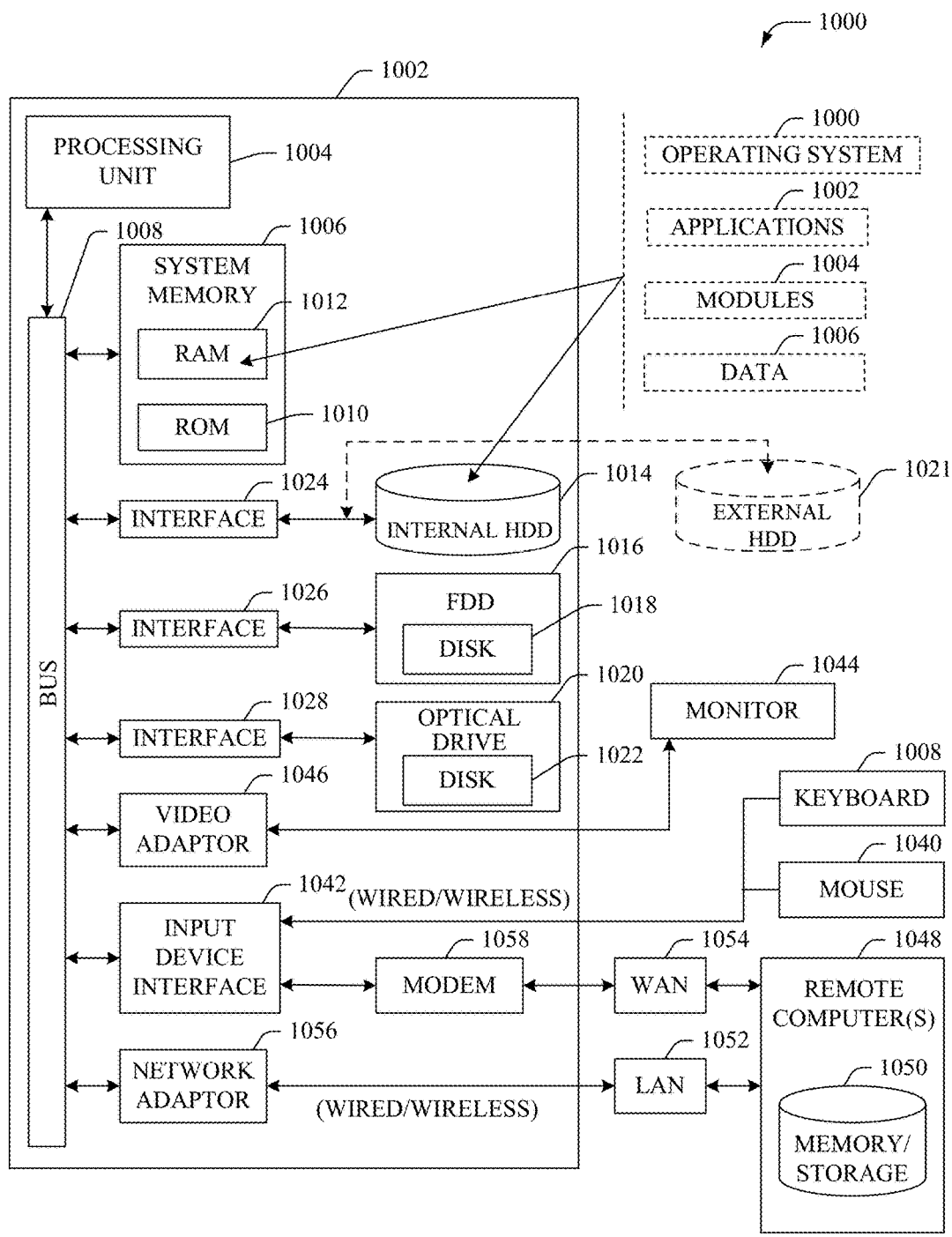
FIG. 10 illustrates a block diagram of a computer that can be employed in accordance with one or more embodiments described herein.

FIG. 10 illustrates a block diagram of a computer that can be employed in accordance with one or more embodiments. Repetitive description of like elements employed in other embodiments described herein is omitted for sake of brevity.

In some embodiments, the computer, or a component of the computer, can be or be included within any number of components described herein comprising, but not limited to, server/distribution authority device 102, device 104, proxy/broker device 106 and/or UICC 110 (or a component of server/distribution authority device 102, device 104, proxy/broker device 106 and/or UICC 110).

In order to provide additional text for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can include computer-readable (or machine-readable) storage media and/or communications media, which two terms are used herein differently from one another as follows. Computer-readable (or machine-readable) storage media can be any available storage media that can be accessed by the computer (or a machine, device or apparatus) and includes both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can include, but are not limited to, random access memory (RAM), read only memory (ROM), electrically erasable programmable read only memory (EE-PROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1010 (e.g., EIDE, SATA), which internal hard disk drive 1014 can also be configured for external use in a suitable chassis (not shown), a magnetic floppy disk drive 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1002, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A communication device can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data.

Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components including the memory. It will be appreciated that the memory components or computer-readable (or machine-readable) storage media, described herein can be either volatile memory or nonvolatile memory or can include both volatile and nonvolatile memory.

Memory disclosed herein can include volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to include, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus, comprising:
   a processor; and
   a memory that stores executable instructions that, when executed by the processor, facilitate performance of operations, comprising:
     performing, by the apparatus, a first type of security function associated with determining whether an information package is authorized to be downloaded to a device other than the apparatus, wherein the information package is associated with updating a functionality of the device, wherein the apparatus comprises a universal integrated circuit card partitioned into domains, and wherein a first domain of the domains is associated with a telecommunications carrier entity and a second domain of the domains is associated with an entity that provides software to update the device; and
     performing, by the apparatus, a second type of security function associated with identifying an authorized user of the apparatus.

2. The apparatus of claim 1, wherein the updating the functionality of the device comprises updating a software functionality of the device other than the apparatus.

3. The apparatus of claim 2, wherein the operations further comprise:
   performing, by the apparatus, a key negotiation with a server configured to transmit the information package to the device other than the apparatus and that facilitates the updating of the functionality of the device; and
   validating, by the apparatus, a digital signature of the information package for the device prior to installation of the information package to cause the updating the software functionality on the device.

4. The apparatus of claim 3, wherein the validating the digital signature comprises comparing the digital signature to a value stored in a firmware over the air partition of the apparatus, and wherein the firmware over the air partition is associated with the performing the first type of security function.

5. The apparatus of claim 1, wherein the performing the second type of security function comprises performing the second type of security function associated with the identifying the authorized user of the apparatus via a carrier domain partition of the apparatus.

6. The apparatus of claim 1, wherein the device comprises a component of a connected car.

7. The apparatus of claim 1, wherein the device comprises a sensor of a digital home environment.

8. The apparatus of claim 1, wherein the device comprises an Internet of Things device.

9. A method, comprising:
   receiving, by a first device comprising a processor, an information package for updating a functionality of a component of first device, wherein the information package is received from a distribution authority device comprising a key negotiated with a second device associated with providing security for the first device, wherein the second device comprises a universal integrated circuit card partitioned into domains, and wherein a first domain of the domains is associated with a telecommunications carrier entity and a second domain of the domains is associated with an entity that provides software to update the first device; and
   validating, by the first device, the information package with the second device based on whether a first value of the information package corresponds to a second value stored at the second device, wherein the second value is stored at an apparatus in response to a negotiation of the key with the distribution authority device prior to the receiving by the first device.

10. The method of claim 9, further comprising:
    updating, by the first device, a software functionality of the component of the first device based on determining that the information package was successfully validated.

11. A non-transitory machine-readable storage medium, comprising executable instructions that, when executed by a processor, facilitate performance of operations, comprising:
    performing a first type of security function associated with determining whether an information package is authorized to be employed to facilitate a software update to a device communicatively coupled to an apparatus comprising the processor and machine-readable storage medium, wherein the processor is associated with a universal integrated circuit card partitioned into two domains, and wherein a first domain of the two domains is associated with a telecommunications carrier entity and a second domain of the two domains is associated with an entity that provides software to update the device; and
    performing a second type of security function associated confirming a privilege associated with use of the apparatus.

12. The non-transitory machine-readable storage medium of claim 11, wherein the operations further comprise:
    performing a key negotiation with a server configured to transmit the information package to the device communicatively coupled to the apparatus and that facilitates the software update to the device; and
    validating a digital signature of the information package for the device prior to installation of the information package on the device.

13. The non-transitory machine-readable storage medium of claim 12, wherein the information package comprises a firmware over the air package.

14. The non-transitory machine-readable storage medium of claim 12, wherein the first type of security function is associated with a first executable instruction of the executable instructions, wherein the first executable instruction is comprised in a first partition of the executable instructions and is associated with a first entity.

15. The non-transitory machine-readable storage medium of claim 14, wherein the first entity is an original equipment manufacturer of the device.

16. The non-transitory machine-readable storage medium of claim 12, wherein the second type of security function is associated with a second executable instruction in a second partition of the executable instructions and is associated with a second entity.

17. The non-transitory machine-readable storage medium of claim 16, wherein the second entity is a telecommunications entity of the apparatus.

18. The non-transitory machine-readable storage medium of claim 11, wherein the device comprises a component of a connected car.

19. The non-transitory machine-readable storage medium of claim 11, wherein the device comprises an Internet of Things device.

* * * * *